United States Patent Office 3,441,376
Patented Apr. 29, 1969

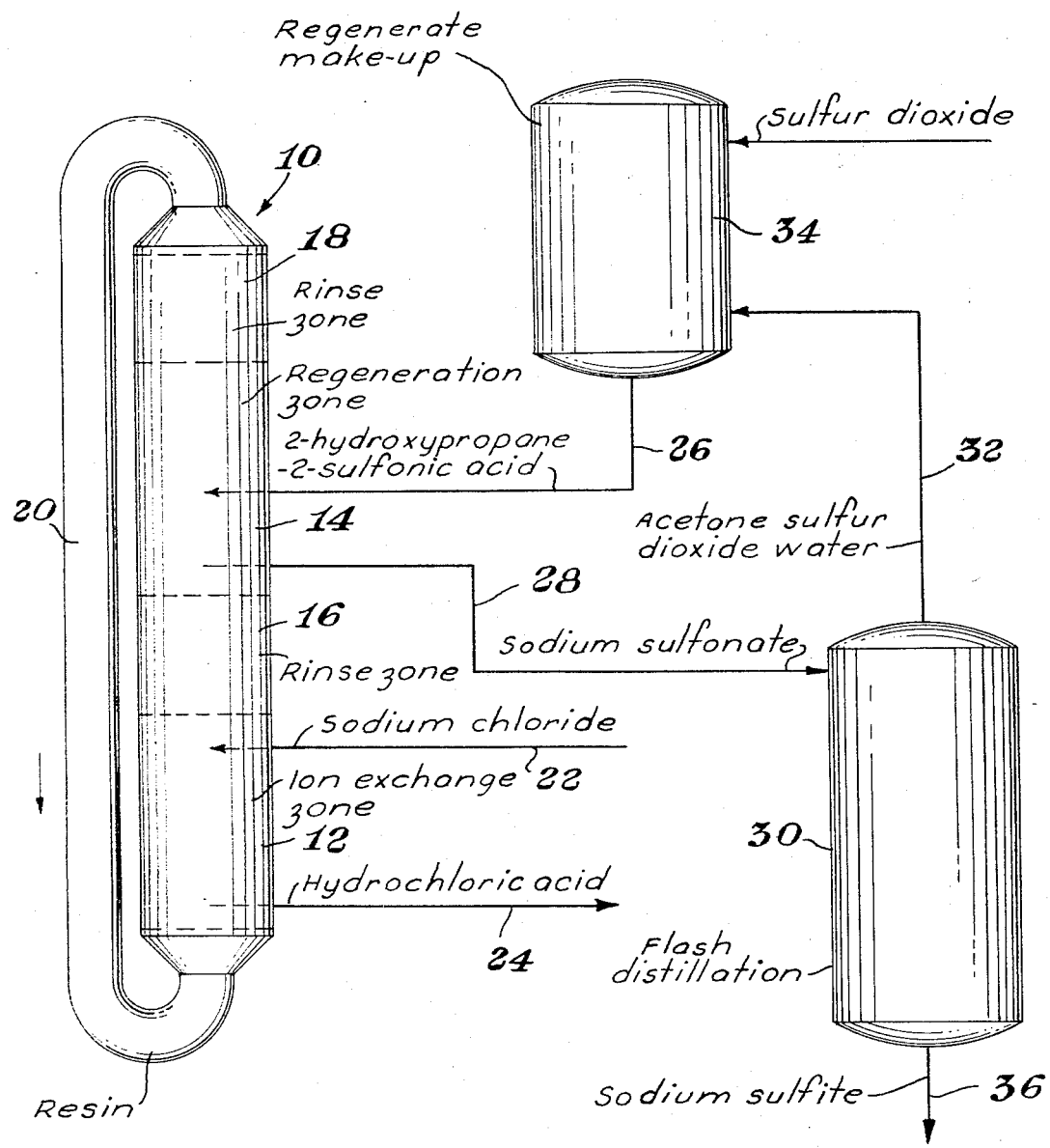

3,441,376
PROCESS FOR PRODUCING AN ACID AND A BASIC SALT FROM AN ALKALI METAL HALIDE
Robert E. Anderson, Midland, Mich., assignor to The Dow Chemical Company, Midland, Mich., a corporation of Delaware
Filed Dec. 26, 1967, Ser. No. 693,541
Int. Cl. C01b 17/62, 7/08
U.S. Cl. 23—129     8 Claims

ABSTRACT OF THE DISCLOSURE

An ion exchange process is provided for the production of an acid and a basic salt from an alkali metal halide. The process includes contacting a solution containing an alkali metal halide with a cation exchange resin in hydrogen form to produce an acid halide, subsequently regenerating the cation exchange resin with a complex sulfonic acid, and treating the regenerant effluent to recover the sulfonic acid regenerant and produce a basic solution containing alkali metal sulfite.

BACKGROUND

This invention relates to a process for producing an acid and a basic salt from an alkali metal halide. More particularly, it relates to an ion exchange process for producing an acid halide from an alkali metal halide, and includes regeneration of the ion exchange material with an acid regenerant to produce an alkali metal basic salt.

Alkali metal halides, and particularly sodium chloride, are a readily available and inexpensive raw material for the production of an acid and a basic material. In the past the only known method for producing acid and base from such a salt was by electrolytic decomposition. Such electrolytic processes, however, require large amounts of electrical energy to decompose the salt, and thus in certain parts of the world have not proven economical.

It is therefore a primary object of this invention to provide a new, improved, and commercially feasible process for producing an acid and a basic material from a neutral salt.

Another object of this invention is to provide an ion exchange process for the production of acid and a basic salt from an alkali metal halide.

Still another object of this invention is to provide an ion exchange process which utilizes a complex sulfonic acid in the production of an acid halide and a basic salt from an alkali metal halide.

Yet another object of this invention is to provide a cation exchange resin process for the production of acid halide from a solution containing an alkali metal halide in which a complex sulfonic acid is used to regenerate the ion exchange resin and to produce a basic solution containing an alkali metal sulfite.

A further object of this invention is to provide a simple, effective, and economical ion exchange process for the production of acid and basic materials from neutral salts.

Additional objects and advantages will be set forth in part in the description which follows, and in part will be obvious from the description, or may be learned by practice of the invention, the objects and advantages being realized and attained by means of the methods, improvements, and combinations of steps particularly pointed out in the appended claims.

STATEMENT OF THE INVENTION

To achieve the foregoing objects and in accordance with its purpose, this invention, as embodied and broadly described, provides a process for the production of an acid and a basic salt from a solution of an alkali metal halide, which comprises: (A) contacting the halide solution with a cation exchange resin in hydrogen form, thereby exchanging the hydrogen ions of the resin for the alkali metal cations in the solution, and producing an effluent containing an acid halide; (B) regenerating the cation exchange resin containing alkali metal cations by contacting it with a complex sulfonic acid solution, comprising the reaction product of sulfur dioxide, water and a water-soluble aldehyde or ketone thereby removing the cations from the resin, restoring the resin to the hydrogen form, and producing a regenerant effluent containing organic sulfonates of the cations removed from the resin; and (C) heating the regenerant effluent to recover the aldehyde or ketone and a portion of the sulfur dioxide as distillate, leaving as a residue a basic solution containing alkali metal sulfite.

In a preferred embodiment a continuous flow of cation-exchange resin, counter-current to the feed and regenerant streams, is employed. For use in the regenerant solution, water-soluble $C_1$–$C_8$ aldehydes and ketones are particularly suitable. Also the distillate can be recycled to prepare more complex sulfonic acid to at least partially regenerate the cation exchange material.

DESCRIPTION

The accompanying drawing, which is incorporated in and constitutes a part of this specification, illustrates an embodiment of the invention, and together with the description, serves to explain the principles of this invention.

The drawing is a schematic diagram of the ion exchange process of this invention and illustrates the production of hydrochloric acid from a solution containing sodium chloride, the recovery and recycling of the components of the regenerant for the ion exchange resin, and the production of a basic solution of sodium sulfite.

It is to be understood that both the foregoing general description and the following detailed description are exemplary and explanatory, but are not restrictive of this invention.

Reference will now be made in detail to the present preferred embodiment of the invention, an example of which is illustrated in the accompanying drawing.

The ion exchange system of this invention, like other ion exchange systems known in the art, is an equilibrium system both in the ion exchange phase of the process and the regeneration phase. The invention utilizes an ion exchange resin that is brought into contact with an aqueous solution containing a dissolved alkali metal halide salt. Preferably, the resin is used in the form of a moving bed in which the resin is first brought into contact with the solution in an ion exchange zone, then discharged to a regeneration zone where it is regenerated, and then recycled to the ion exchange zone.

A countercurrent continuous ion exchange reactor of the type described by Higgins U.S. Patent 2,815,322 is particularly suitable for use in the process of this invention and is schematically shown in the drawing. The continuous reactor, generally indicated at 10, includes an ion exchange zone 12; a regeneration zone 14; water rinse zones 16 and 18 located immediately above the ion exchange and regeneration zones, respectively; and a recycling path 20.

As shown in the drawing, an aqueous solution 22 containing an alkali metal halide is initially contacted with the ion exchange material in zone 12 of continuous reactor 10. Broadly stated, the purpose of ion exchange in zone 12 is to remove the alkali metal cations from the solution and replace them with hydrogen ions from the resin. These hydrogen ions form an acid halide with the halide anions present in the solution.

In accordance with this invention, the ion exchange material is a cation exchange resin in the hydrogen form that is capable of providing hydrogen ions for exchange with the alkali metal cations in the solution. Exemplary of cation exchange resins which may be used in the process of this invention are strong acid resins such as the sulfonated styrene-divinylbenzene copolymers commercially available under the trade names "Dowex 50W–X8" from The Dow Chemical Company, "Amberlite IR–120" from Rohm and Haas Company, "Ionac C–240" from Ionac Chemical Co., and the like. A preferred cation exchange resin for use in the process of this invention is Dowex 50W–X8 resin.

The aqueous solution of the alkali metal halide to be treated by the process of this invention is initially passed through the resin in continuous reactor 10 to remove the alkali metal cations from the solution. Exemplary of alkali metal halides that can be used in the process of this invention are sodium chloride, sodium fluoride, sodium bromide, potassium chloride, lithium chloride, lithium bromide, and similar compounds of Group I-A and VII-A elements. The aqueous solution of the alkali metal halide may either be prepared or may be a brine containing a naturally occurring alkali metal halide salt.

In its most preferred form, the present process utilizes sodium chloride to produce hydrochloric acid and a basic sodium salt. The process of this invention, therefore, will be described as it relates to the treatment of an aqueous sodium chloride solution. It is to be understood, however, that the process is equally applicable to the production of acids and basic salts from aqueous solutions of other alkali metal halides.

The reaction that occurs when an aqueous solution of sodium chloride is passed through ion exchange zone 12 is exemplified by the following equation, in which $RSO_3^-$ represents the cation exchange resin:

$$NaCl + RSO_3H \rightarrow Na^+RSO_3^- + HCl$$

The sodium chloride in solution 22 is converted to its acid component, with the sodium ions having been absorbed by resin and exchanged for the hydrogen ions in the resin. The effluent 24 from zone 12 thus contains hydrochloric acid.

Spent cation exchange resin from zone 12, containing sodium ions, is then passed through rinse zone 16 where the resin is washed with water to prevent cross-contamination between the hydrochloric acid formed in ion exchange zone 12 and the acid used in regeneration zone 14. While it is not essential to rinse the spent resin following ion exchange, the inclusion of such a rinse step in the present process is desirable, because the presence of chloride ion in the resin can present a serious corrosion problem in the subsequent treatment of the regenerant effluent to produce a basic sodium salt.

In accordance with this invention, the spent, and desirably rinsed, cation exchange resin containing ionically bound sodium ions is regenerated in regeneration zone 14 by contacting the resin with a complex sulfonic acid solution such as described by Wilson U.S. Patent 3,248,278. This sulfonic acid solution is prepared by adsorbing sulfur dioxide in an aqueous solution of a suitable water-soluble aldehyde or ketone to produce a strong, complex sulfonic acid by the reaction:

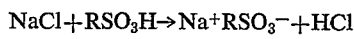

where

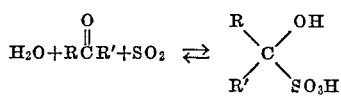

is the aldehyde or ketone. The complex sulfonic acid ($ZSO_3H$) is a highly effective resin regenerant in the present system.

Exemplary of carbonyl compounds suitable for use in the preparation of the complex sulfonic acid are water-soluble $C_1$-$C_8$ aldehydes and ketones, such as acetone, acetaldehyde, formaldehyde, furfuraldehyde, isobutyraldehyde, cyclohexanone, methyl ethyl ketone, benzaldehyde, methyl isobutyl ketone, mesityl oxide, and salicylaldehyde. Acetone is the preferred carbonyl compound used in the process of this invention. Acetone reacts with sulfur dioxide and water to produce 2-hydroxypropane-2-sulfonic acid.

At room temperature maximum ionization of the complex sulfonic acid can be most economically achieved by using a weight ratio of about seven (7) parts water to about one (1) part of acetone. Increasing the ratio of acetone to water above about 7 to 1 only insignificantly increases the solubility of sulfur dioxide in the mixture. Further, an optimum sulfonic acid composition should utilize a minimum amount of acetone or other carbonyl compound, both because the carbonyl compound is the most expensive reagent in the system and because the solution should be as aqueous as possible to maximize ionization of the acid. At a weight ratio of seven (7) parts water to one (1) part acetone, the complex sulfonic acid solution contains about 11% acetone, 12% sulfur dioxide, and 77% water, and has a normality roughly equivalent to a 2 N acid.

Complex sulfonic acid solution 26 containing $H^+$ cations and $ZSO_3^-$ anions is brought into contact with the spent cation exchange resin in regeneration zone 14 of continuous reactor 10. In this regeneration reaction, the hydrogen ions in the sulfonic acid solution are exchanged for the sodium ions in the cation exchange resin to produce an effluent 28 which contains the sodium salt of the complex sulfonic acid. The cation regeneration reaction can be exemplified by the following equation:

$$Na^+RSO_3^- + ZSO_3H \rightarrow RSO_3H + NaZSO_3$$

The sodium ions are thus removed from the resin in the form of sodium sulfonate, and the resin is returned to the hydrogen form for further use in the initial treatment of sodium chloride solution. Sodium sulfonate is relatively soluble in water, and thus regenerant effluent 28 is an aqueous solution containing dissolved sodium sulfonate.

The regenerated ion exchange resin from regeneration zone 14 of reactor 10 is passed through rinse zone 18 where it is washed with water to avoid loss of residual amounts of complex sulfonic acid left in the resin following regeneration. While it is not essential to rinse the regenerated resin, the rinsing step is preferred because the carryover of sulfonic acid in the regenerated resin can represent a significant loss of sulfur dioxide and carbonyl compound.

The regenerated, and desirably rinsed, cation exchange resin is recycled from rinse zone 18 through passage 20 for reuse in ion exchange zone 12 of reactor 10. The rinse effluent stream from zone 18 is combined with regenerant effluent 28 exiting regeneration zone 14.

In accordance with a preferred embodiment of this invention, regenerant effluent 28 is treated to recover its carbonyl and sulfur dioxide components for further use in the regeneration of the cation exchange resin. This recovery procedure is preferably carried out by thermal distillation of the regenerant effluent at a temperature of about 100° C. in a suitable vessel 30. Such distillation effectively strips the carbonyl compound, a portion of the sulfur dioxide, and some water from effluent 28 as distillate 32. Since all of distillate 32 is to be recombined to form the complex sulfonic acid regenerant, the distillate can be immediately passed to regenerant make-up tank 34 without the need for separating it into its various components.

Distillation of regenerant effluent also produces a bottoms solution 36 which comprises sodium sulfite, the basic salt solution produced in the process of this invention. The decomposition of sodium sulfonate into sodium sulfite and the components of the complex sulfonic acid regenerant can be exemplified by the following equation:

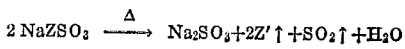

where Z′ is the aldehyde or ketone originally used to form the sulfonic acid regenerant and Z is the hydroxy-substituted form of that compound.

It will be apparent from the foregoing description that this invention provides a simple, economical, and effective method for the production of an acid and a basic salt from an aqueous solution of an alkali metal halide, which process has several important advantages not heretofore realized in prior art processes. Such advantages include the production of a valuable basic salt solution by regeneration of cation exchange resin, thereby eliminating the usual problem of disposing of regenerant waste in the conventional acid regeneration of a cation exchange resin. Further, the organic component of the chemical regenerant used to regenerate the cation exchange resin in the process of this invention is substantially recovered, together with a portion of the sulfur dioxide originally used to form the regenerant.

For a clearer understanding of this invention, specific examples of it are set forth below. These examples are merely illustrative and are not intended to limit the scope and underlying principles of the invention in any way.

EXAMPLE 1

Regenerant solution

This example illustrates the preparation of 2-hydroxypropane-2-sulfonic acid as a regenerant for the cation exchange resin.

The complex sulfonic acid is prepared by adsorbing sulfur dioxide gas in mixtures containing various ratios of water to acetone in a gas adsorption column. The adsorption column consists of a 1-inch glass tube filled to a depth of about 8 inches with berl saddles and topped with a 3-bulb condenser.

Sulfur dioxide is fed into the bottom of the adsorption column through a fritted-glass sparger at a point just below the level of packing in the column. The liquid mixture of acetone and water is introduced into the column above the level of the packing by means of a pump. The liquid mixture drains down through the packing and out the bottom of the column into a 2-liter flask fitted with a reflux condenser. The mixture is condensed and recycled through the pump to the top of the adsorber.

The sulfonic acid compositions prepared by this procedure using different ratios of water to acetone and various adsorption periods at room temperature are shown in the following table.

TABLE

| Weight ratio of $H_2O$/Acetone | Contact time (hrs.) | Normality of acid |
| --- | --- | --- |
| 1/1 | 1 | [1] 1.8 (lower phase) |
| 1/1 | 1.75 | [1] {2.09; p=1.072 / 3.43; p=0.989} |
| 2/1 | 2 | 1.95 |
| 2/1 | 3 | [2] 2.48 |
| 3/1 | 1 | 1.7 |
| 3/1 | 4 | 2.1 |
| 5/1 | 2 | 0.42 |
| 5/1 | 3 | 1.0 |
| 5/1 | 5 | 1.96 |
| 9/1 | 1 | 0.87 |
| 9/1 | 2 | 1.45 |
| 9/1 | 3 | 1.64 |
| 9/1 | 4 | 1.72 |
| 9/1 | 5 | 1.90 |

[1] Liquid separated into two phases.
[2] Supersaturated.

From the results of this table it can be seen that the solubility of sulfur dioxide in the mixture reaches a maximum concentration of roughly about 2 N at 20–25° C. regardless of the weight ratio of water to acid, although higher ratios require longer contact times to achieve maximum sulfur dioxide adsorption. The optimum sulfonic acid composition produced by this procedure is found to have a weight ratio of about seven (7) parts water to one (1) part acetone. At this weight ratio, a 2 N acid solution contains about 11% acetone, 12% sulfur dioxide, and 77% water.

EXAMPLE 2

Production of HCl and $Na_2SO_3$

This example illustrates the production of hydrochloric acid and a basic solution of sodium sulfite from an aqueous solution containing sodium chloride with a cation exchange resin.

Hydrochloric acid production

A saturated aqueous solution of approximately 25% by weight sodium chloride is passed through a continuous ion exchange reactor countercurrent to a flow of Dowex 50W–X8 resin. The resin has an operating capacity of 1800 milliequivalents per liter, thus adsorbing a maximum of 1.8 milliequivalents of sodium ions per ml. of resin.

The sodium ions in the solution are adsorbed by the resin and exchanged for the hydrogen ions in the resin, producing an effluent containing hydrochloric acid which is withdrawn from the reactor as 15–16% hydrochloric acid.

Production of alkali metal sulfite

The spent cation exchange resin is regenerated with the 2 N (2 meq./ml.), 2-hydroxypropane-2-sulfonic acid solution prepared in Example 1.

Since the resin now contains 1.8 milliequivalents of sodium ions per ml. of resin, 0.9 ml. of the sulfonic acid is required per ml. of resin to remove the sodium ions from the resin. A total of 1.0 ml. of the acid is used to insure substantial regeneration of the resin.

The regenerant effluent contains 1.8 meq. per ml. of sodium ions, essentially no hydrogen ions, and 1.8 meq. per ml. of $RSO_3^-$ anions; the hydrogen ions in the sulfonic acid solution having been adsorbed by the resin and exchanged for the sodium ions. The 1.8 N concentration of the effluent is the result of a slight dilution of the 2 N acid in the process.

The regenerant effluent is flash distilled at about 100° C. to recover substantially all of the acetone and approximately one-half (1.8 mmoles/ml. of effluent) of the sulfur dioxide originally used in the production of the complex sulfonic acid solution. Removal of sulfur dioxide from the effluent produces an aqueous solution containing approximately 0.1 gram of sodium sulfite per ml. of effluent processed.

The acetone and sulfur dioxide flashed from the effluent are recycled to the regenerant make-up tank for use in the preparation of additional regenerant.

The invention in its broader respects is not limited to the specific details shown and described but departures may be made from such details within the spirit and scope of the accompanying claims without departing from the principles of the invention and without sacrificing its chief advantages.

What is claimed is:

1. A process for the production of an acid halide and an alkali metal sulfite from a solution containing an alkali metal halide, which comprises:
   (A) contacting the solution with a strong acid cation exchange resin in hydrogen form in an ion exchange zone, thereby exchanging the hydrogen ions from the cation exchange resin for the alkali metal cations in the solution and forming an acid halide and rinsing the ion exchange resin with water to remove residual acid halide in the resin;
   (B) regenerating the cation exchange resin containing alkali metal cations in a regeneration zone by contacting it with a complex sulfonic acid solution consisting of the reaction product of sulfur dioxide, water and a water-soluble aldehyde or ketone, thereby removing the alkali metal cations from the cation exchange resin, restoring the resin to the hydrogen form, and producing a regenerant effluent containing organic sulfonates of the alkali metal cations and rinsing the ion exchange resin with water following its regeneration with the complex sulfonic acid to remove residual sulfonic acid from the regenerated resin;

(C) heating the regenerant effluent and recovering the aldehyde or ketone and a portion of the sulfur dioxide as distillate in a single vessel and forming a basic solution containing alkali metal sulfite;

(D) recycling the distillate for use in regeneration of the cation exchange resin; and (E) recycling the regenerated resin to the ion exchange zone.

2. The process of claim 1 using a water-soluble $C_1$–$C_8$ aldehyde or keytone.

3. The process of claim 2 wherein the ketone is acetone.

4. The process of claim 3, werein the sulfonic acid solution comprises, by weight, about 11% acetone, 12% sulfur dioxide, and the balance essentially water.

5. The process of claim 1, in which the alkali metal halide solution is a brine of a naturally occurring alkali metal halide salt.

6. The process of claim 1, wherein the alkali metal halide solution is an aqueous solution of sodium chloride, said process yielding hydrochloric acid and a basic solution of sodium sulfite.

7. The process of claim 1, wherein the cation exchange resin is a sulfonic acid resin.

8. The process of claim 7, wherein the cation exchange resin is a sulfonated copolymer of styrene-divinylbenzene.

References Cited

UNITED STATES PATENTS 3,248,278   4/1966   Wilson _____ 210—38 X

SAMIH N. ZAHARNA, *Primary Examiner.*

U.S. Cl. X.R.

23—154; 210—32, 38